J. A. Bachman,
Grinding Marble,
No. 63,982. Patented Apr. 23, 1867.
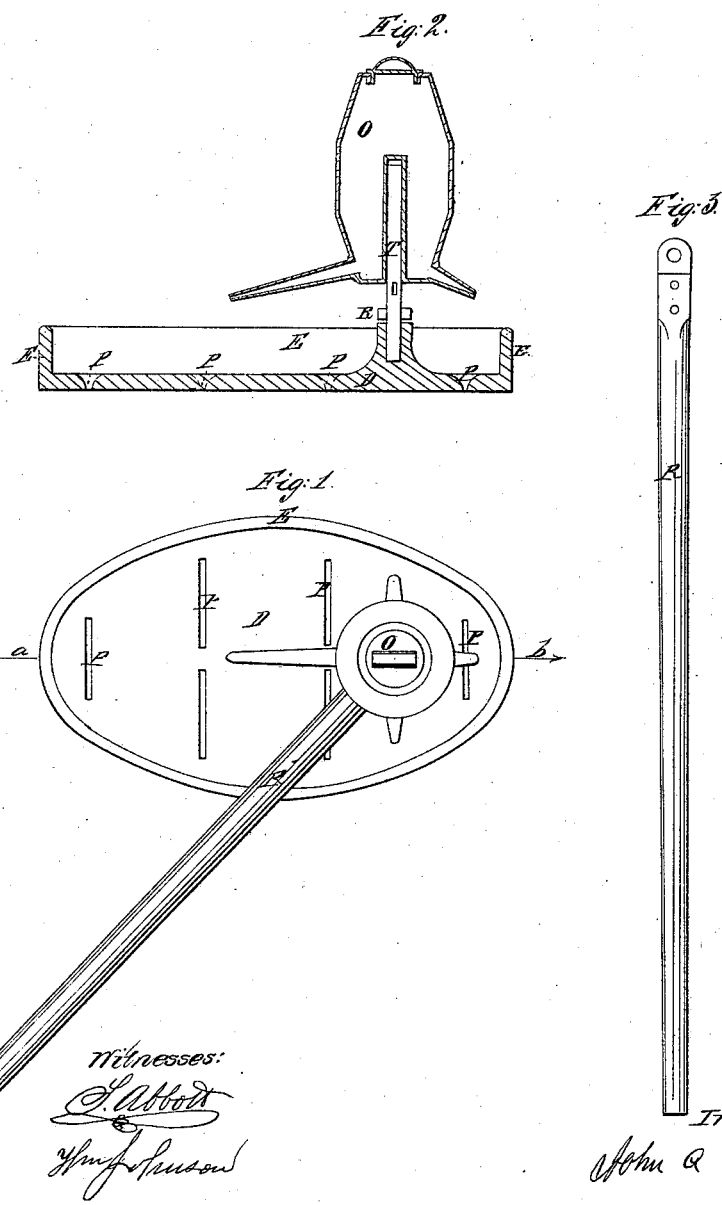
Witnesses:
J. Abbott
Henry J. Janson
Inventor:
John A. Bachman

United States Patent Office.

JOHN A. BACHMAN, OF LAMBERTVILLE, NEW JERSEY.

Letters Patent No. 63,982, dated April 23, 1867.

---

IMPROVED MACHINE FOR GRINDING THE SURFACE OF MARBLE OR STONE.

---

*The Schedule referred to in these Letters Patent and making part of the same.*

---

TO ALL WHOM IT MAY CONCERN:

Be it known that I, JOHN A. BACHMAN, of the town of Lambertville, in the county of Hunterdon, and State of New Jersey, have invented a new and useful improvement in the apparatus commonly called a "Rubber," for rubbing or grinding the surface of marble or stone to a smooth and level plane; and I hereby declare the following to be a full and exact description thereof, reference being had to the accompanying drawings, and to the letters of reference marked thereon.

My invention consists substantially in the use of a metal plate having a rim around its outer edge of sufficient height to form a box for the purpose of holding sand, the bottom of the plate or box having holes or slotted openings through which the sand passes upon the face of the stone to be rubbed or ground; furthermore, in attaching to said plate a vessel for the purpose of holding water, having small openings near its bottom, through which the water passes upon the sand; also, in inserting a shaft or pin between the centre and periphery of the plate, and perpendicular to its face, for the double purpose of carrying the water-vessel and forming a journal or axis through the end of a handle, which, when moved forward and backward, by reason of the eccentricity of the pin causes the plate to revolve upon the face of the stone to be ground. In the accompanying drawings—

Figure 1 presents a plan or top view of the apparatus.

Figure 2 is a sectional side view through *a b* of the same.

Figure 3 is the handle by which it is moved—

The several letters in all the figures referring to the same parts.

D is the plate, the under or flat surface of which is laid upon the stone to be rubbed. P P P P are openings through which the sand and water pass. E is the rim extending around the plate to retain the sand until it shall have been fed or passed through the openings by the motion of the plate upon the face to be ground. O is the water-vessel, having several small openings or spouts near the bottom to distribute the water over the sand. T is the pin or shaft made fast in the plate D, and which supports the water-vessel in position, and by means of which, passing through a handle, a circular motion is communicated to the plate over the face of the stone. R is the handle, having a hole in one end, through which the pin or shaft passes, and by which the plate is moved.

What I claim as my invention, and wish to secure by Letters Patent, is—

A metal plate, with rim and openings, combined with a water-vessel and handle, in the manner and for the purpose substantially as herein described and set forth.

JOHN A. BACHMAN.

Witnesses:
T. ABBOTT,
WM. JOHNSON.